US012758915B2

(12) United States Patent
Fukui et al.

(10) Patent No.: US 12,758,915 B2
(45) Date of Patent: Oct. 13, 2026

(54) ORGANIC IODINE REMOVER AND ORGANIC IODINE REMOVING APPARATUS

(71) Applicant: Hitachi GE Vernova Nuclear Energy, Ltd., Hitachi (JP)

(72) Inventors: Sohei Fukui, Tokyo (JP); Motoi Tanaka, Ibaraki (JP); Kazuo Tominaga, Ibaraki (JP); Masaaki Tanaka, Ibaraki (JP); Fumio Totsuka, Ibaraki (JP); Tomoharu Hashimoto, Ibaraki (JP)

(73) Assignee: Hitachi GE Vernova Nuclear Energy, Ltd., Hitachi (JP)

( * ) Notice: Subject to any disclaimer, the term of this patent is extended or adjusted under 35 U.S.C. 154(b) by 1099 days.

(21) Appl. No.: 17/787,105

(22) PCT Filed: Dec. 1, 2020

(86) PCT No.: PCT/JP2020/044676
§ 371 (c)(1),
(2) Date: Jun. 17, 2022

(87) PCT Pub. No.: WO2021/124868
PCT Pub. Date: Jun. 24, 2021

(65) Prior Publication Data

US 2023/0032273 A1 Feb. 2, 2023

(30) Foreign Application Priority Data

Dec. 18, 2019 (JP) ................................ 2019-228420

(51) Int. Cl.

| | |
|---|---|
| ***B01D 53/14*** | (2006.01) |
| ***B01J 20/22*** | (2006.01) |
| ***G21F 9/02*** | (2006.01) |

(52) U.S. Cl.
CPC .............. *B01D 53/14* (2013.01); *B01J 20/22* (2013.01); *G21F 9/02* (2013.01); *B01D 2252/30* (2013.01);
(Continued)

(58) Field of Classification Search
CPC ........... B01D 53/14; B01D 2257/2068; B01D 2258/02; B01J 20/22; G21F 9/02
(Continued)

(56) References Cited

U.S. PATENT DOCUMENTS

| | | | | | |
|---|---|---|---|---|---|
| 3,471,544 | A | 10/1969 | Tomalia | | |
| 4,695,561 | A * | 9/1987 | Deitz | B01D 53/68 | 376/314 |
| 2008/0258113 | A1* | 10/2008 | Clyburne | C07F 9/54 | 252/364 |

FOREIGN PATENT DOCUMENTS

| | | | |
|---|---|---|---|
| CN | 106554272 | A | 4/2017 |
| JP | H07-209488 | A | 8/1995 |

(Continued)

OTHER PUBLICATIONS

Anderson et al., "Phase behaviour of trihexyl (tetradecyl) phosphonium chloride, nonane and water", Green Chemistry, vol. 11, 2009, pp. 780-784.

(Continued)

*Primary Examiner* — Anthony J Zimmer
*Assistant Examiner* — Annette Phan
(74) *Attorney, Agent, or Firm* — Foley & Lardner LLP

(57) ABSTRACT

An organic iodine remover is a remover for removing organic iodine and is a substance composed of a cation and an anion, and the cation (for example, a phosphonium cation, an ammonium cation, or a sulfonium cation) has a molecular structure in which an electron donating group (for example, a phosphino group, an amino group, a sulfanyl
(Continued)

group, a hydroxy group, or an alkoxy group) is bonded to a phosphorus atom, a nitrogen atom or a sulfur atom. An organic iodine removing apparatus includes: a vessel into which the organic iodine remover for removing the organic iodine is charged; and introduction pipes through which a fluid containing organic iodine is introduced into the organic iodine remover.

14 Claims, 2 Drawing Sheets

(52) U.S. Cl.
CPC .. *B01D 2257/2068* (2013.01); *B01D 2258/02* (2013.01)

(58) Field of Classification Search
USPC .......................................................... 423/24
See application file for complete search history.

(56) References Cited

FOREIGN PATENT DOCUMENTS

| | | | |
|---|---|---|---|
| JP | 2002-350588 | A | 12/2002 |
| JP | 2012-250198 | A | 12/2012 |
| JP | 2015-522161 | A | 8/2015 |
| KR | 2019-0105459 | A | 9/2019 |
| WO | WO2014/007977 | A1 | 1/2014 |
| WO | WO2016/045980 | A1 | 3/2016 |

OTHER PUBLICATIONS

Extended European Search Report issued in corresponding EP Application No. 20903097.2 dated Dec. 18, 2023 (14 pages).
Gudat et al., "A zwitterionic phosphanyl-substituted phosphonio-benzo[c]phospholide as bridging ligand towards dinuclear transition metal carbonyls", Journal of Organometallic Chemistry, vol. 643-644, 2002, pp. 181-188.
Guentay et al., "Radiochemical studies of the retention of volatile iodine in aqueous solutions" Journal of Radioanalytical and Nuclear Chemistry, vol. 273, No. 3 (2007) pp. 557-561.
Liao et al., "Highly Efficient and Reversible Iodine Capture in Hexaphenylbenzene-Based Conjugated Microporous Polymers" Macromolecules, vol. 49, 2016, pp. 6322-6333.
Sarah Kirchhecker, "Renewable Imidazolium Zwitterions as Platform Molecules for the Synthesis of Ionic Liquids and Materials" Dissertation, Oct. 31, 2014, 136 pages.
Selva et al., "Phosphonium salts and P-ylides" Organophosphorus Chem., vol. 45, 2016, pp. 132-169.
Tindale et al., "Thiol appended, fluorinated phosphonium ionic liquids as covalent superhydrophobic coatings" Journal of Molecular Liquids vol. 152, 2010, pp. 14-18.
International Search Report with English Translation and Written Opinion of International Patent Application No. PCT/JP2020/044676 mailed Feb. 22, 2021.

* cited by examiner

[FIG. 1]
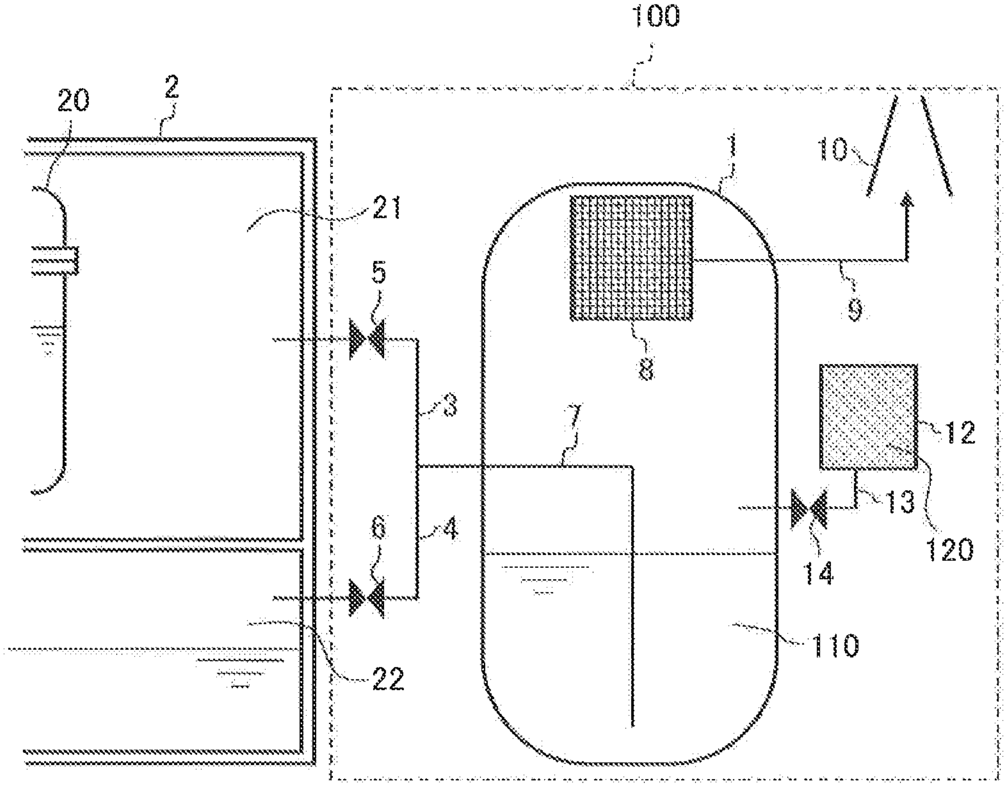

[FIG. 2]
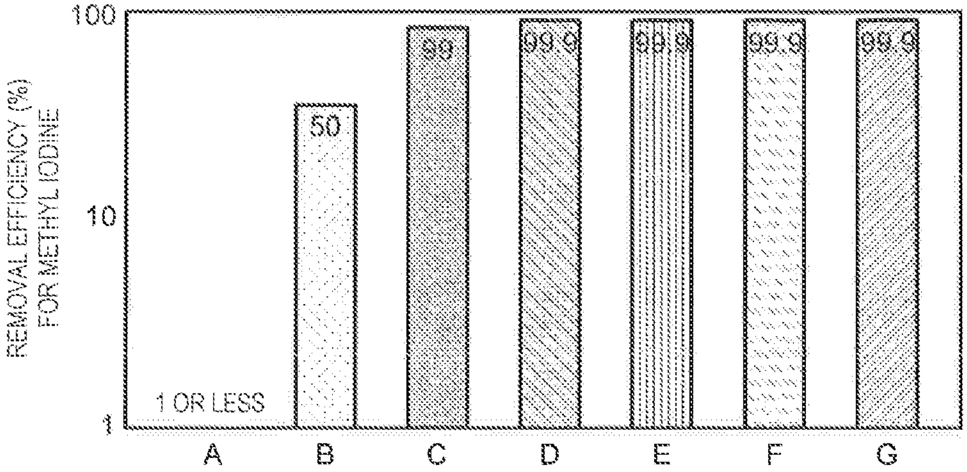
| | CATION STRUCTURE | ANION STRUCTURE |
|---|---|---|
| A |  | $F_3CO_2S-\bar{N}-SO_2CF_3$ |
| B | | $NC-\bar{N}-CN$ |
| C | | $Cl^-$ |
| D |  | |
| E | 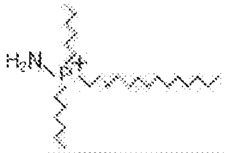 | |
| F |  | |
| G | 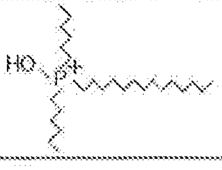 | |

ORGANIC IODINE REMOVER AND ORGANIC IODINE REMOVING APPARATUS

TECHNICAL FIELD

The present invention relates to an organic iodine remover for removing organic iodine contained in a fluid such as steam, including radioactive organic iodine released from a reactor, and an organic iodine removing apparatus using the organic iodine remover.

BACKGROUND ART

At a reactor facility, a filtered containment venting apparatus is installed to prevent radioactive substances released from a reactor from leaking into the environment. When a reactor core is damaged or a pressure in a containment vessel abnormally rises due to an accident in the reactor, the containment vessel is broken and large-scale leakage occurs. Therefore, steam in the containment vessel is vented in advance to prevent overpressure breakage. When high-temperature and high-pressure steam is released from the reactor into the containment vessel, the steam is passed through the filtered containment venting apparatus to remove major radioactive substances before the steam is released into the atmosphere.

Examples of the radioactive substances generated during the accident in the reactor include noble gases, aerosols, inorganic iodine, or organic iodine. In the filtered containment venting apparatus, these radioactive substances excluding the noble gases are trapped in a vessel, and are prevented from being released to the environment. Generally, as described in PTL 1, the filtered containment venting apparatus retains scrubbing water that acts as a wet filter in the vessel, and incorporates a metal filter that is a dry filter.

The scrubbing water may be one in which sodium thiosulfate, sodium hydroxide, or the like is added to water, and the vented steam is released into the scrubbing water. The inorganic iodine (elemental iodine) or the aerosols ionized by a reaction with sodium thiosulfate is removed by being dissolved in the scrubbing water. In addition, the aerosols that are released from the scrubbing water into a gas phase are removed by adhering to and colliding with the metal filter. The organic iodine is removed by a dry filter such as silver zeolite or activated carbon as described in PTL 2.

CITATION LIST

Patent Literature

PTL 1: JP-T-2015-522161
PTL 2: JP-A-H07-209488

SUMMARY OF INVENTION

Technical Problem

The organic iodine released from the reactor, including methyl iodine, is poorly soluble in water, and is not sufficiently removed even being introduced into pool water in a pressure suppression chamber or scrubbing water during venting. In addition, organic iodine such as methyl iodine may be generated by a reaction of elemental iodine in an exhaust process from the reactor. Therefore, it is necessary to take measures to reliably confine various chemical species containing radioactive iodine in a boundary, and there is a demand for an organic iodine remover capable of efficiently removing organic iodine in a fluid such as vent gas.

Generally, as the remover capable of removing the organic iodine, silver zeolite or activated carbon is known (see PTL 2). However, since the remover in the related art has reduced removal efficiency when water adheres to the remover, a mechanism for removing moisture is required when an influence of the moisture is a concern, and thus a structure of the filtered containment venting apparatus is complicated. In addition, since a large amount of remover in the related art is required, a special apparatus design or a complicated apparatus structure is required as disclosed in PTL 2.

Therefore, an object of the invention is to provide an organic iodine remover capable of efficiently removing organic iodine in a fluid, and an organic iodine removing apparatus using the organic iodine remover.

Solution to Problem

In order to solve the above problems, an organic iodine remover according to the invention is an organic iodine remover for removing organic iodine and is a substance composed of a cation and an anion, and the cation has a molecular structure in which an electron donating group is bonded to a phosphorus atom, a nitrogen atom, or a sulfur atom.

In addition, an organic iodine removing apparatus according to the invention is an organic iodine removing apparatus that removes organic iodine, and includes a vessel into which an organic iodine remover for removing organic iodine is charged and an introduction pipe through which a fluid containing organic iodine is introduced into the organic iodine remover, in which the organic iodine remover is a substance composed of a cation and an anion, and the cation has a molecular structure in which an electron donating group is bonded to a phosphorus atom, a nitrogen atom, or a sulfur atom.

Advantageous Effect

According to the invention, an organic iodine remover capable of efficiently removing organic iodine in a fluid and an organic iodine removing apparatus using the organic iodine remover can be provided.

BRIEF DESCRIPTION OF DRAWINGS

FIG. 1 is a cross-sectional view schematically showing an example of an organic iodine removing apparatus according to the invention.

FIG. 2 is a diagram showing specific examples of a removal efficiency for organic iodine and a chemical structure of an organic iodine remover.

DESCRIPTION OF EMBODIMENTS

Hereinafter, an organic iodine remover according to one embodiment of the invention and an organic iodine removing apparatus using the organic iodine remover will be described with reference to the drawings. In the following drawings, common components are denoted by the same reference numerals, and repetitive descriptions thereof are omitted.

The organic iodine remover according to the present embodiment is a substance that exhibits an effect of removing organic iodine in a fluid. By allowing a fluid such as steam containing organic iodine to pass through the organic iodine remover, the organic iodine in the fluid can be dissolved, the dissolved organic iodine can be decomposed, and a decomposition product of the organic iodine can be retained in the organic iodine remover itself.

The organic iodine remover according to the present embodiment can be used, for example, as a wet filter for treating vent gas released to an outside of a reactor containment vessel during filtered containment venting performed during an accident in a reactor. When the vent gas containing radioactive organic iodine is passed through the organic iodine remover, diffusion of the radioactive iodine can be prevented by dissolution and decomposition of the organic iodine, and retention of the decomposition product.

FIG. 1 is a cross-sectional view schematically showing an example of the organic iodine removing apparatus according to the invention.

FIG. 1 shows an example in which the organic iodine remover is applied to a filtered containment venting apparatus of a reactor facility. A filtered containment venting apparatus 100 shown in FIG. 1 is configured to treat the vent gas released from a reactor containment vessel 2 by allowing the vent gas to pass through an organic iodine remover 120 injected into a filtered containment venting vessel 1.

As shown in FIG. 1, the filtered containment venting apparatus (organic iodine removing apparatus) 100 includes the filtered containment venting vessel (vessel) 1, a dry well venting pipe (introduction pipe) 3, a wet well venting pipe (introduction pipe) 4, isolation valves 5 and 6, an inlet pipe (introduction pipe) 7, a metal filter 8, an outlet pipe 9, an exhaust cylinder 10, a storage vessel 12, an injection pipe 13, and an injection valve 14. The filtered containment venting apparatus 100 is connected to the reactor containment vessel 2 via pipes through which the vent gas flows. The reactor containment vessel 2 houses a reactor pressure vessel 20.

In the reactor containment vessel 2, venting is performed in order to prevent an abnormal rise in pressure and temperature during a severe accident in the reactor. During the filtered containment venting, ambient gas in the reactor containment vessel 2 is released to the atmosphere through the filtered containment venting apparatus 100. The filtered containment venting apparatus 100 is used to remove radioactive substances in the vent gas released from the reactor containment vessel 2 as much as possible.

The reactor containment vessel 2 has a dry well 21 in which the reactor pressure vessel 20 is housed, and a wet well 22 in which a pressure suppression pool is formed. Steam released into the dry well 21 or steam released from a main steam system due to overpressure can flow into the wet well 22 through a venting pipe (not shown). Since high-temperature and high-pressure steam is condensed by pool water in the wet well 22, the pressure in the reactor containment vessel 2 is suppressed.

One end of the dry well venting pipe 3 used for venting the dry well 21 is connected to the dry well 21. The normally closed isolation valve 5 is provided in the dry well venting pipe 3. The other end of the dry well venting pipe 3 is connected to the inlet pipe 7.

In addition, one end of the wet well venting pipe 4 used for venting the wet well 22 is connected to the wet well 22. The normally closed isolation valve 6 is provided in the wet well venting pipe 4. The other end of the wet well venting pipe 4 is connected to the inlet pipe 7.

One end of the inlet pipe 7 is connected to the dry well venting pipe 3 and the wet well pipe vent 4, and the other end of the inlet pipe 7 extends to a vicinity of a bottom inside the filtered containment venting vessel 1. A scrubber nozzle (not shown) formed by, for example, a multiple venturi nozzle is attached to the other end of the inlet pipe 7. The vent gas released from the reactor containment vessel 2 is sprayed by the scrubber nozzle into a liquid phase in the filtered containment venting vessel 1.

In FIG. 1, scrubbing water 110 is retained inside the filtered containment venting vessel 1. The scrubbing water 110 is injected into the filtered containment venting vessel 1 up to a height at which a tip of the inlet pipe 7 is submerged and a height at which a gas phase remains in an upper portion in the vessel. The other end of the inlet pipe 7 is introduced into the liquid phase inside the filtered containment venting vessel 1.

In addition, the storage vessel 12 is connected to the filtered containment venting vessel 1 via the injection pipe 13. An inside of the filtered containment venting vessel 1 and an inside of the storage vessel 12 communicate with each other via the injection pipe 13. The injection valve 14, which can be opened and closed manually or automatically, is provided in the injection pipe 13. The organic iodine remover 120 is stored in the storage vessel 12.

The organic iodine remover 120 is injected from the storage vessel 12 into the filtered containment venting vessel 1 when the injection valve 14 is opened during performing the filtered containment venting. The organic iodine remover 120 can be injected by various methods such as injection by a water head pressure and injection by gas pressurization using nitrogen gas or the like. The storage vessel 12 may be provided outside the filtered containment venting vessel 1, but may also be provided inside the filtered containment venting vessel 1.

The scrubbing water 110 is mainly used for trapping inorganic iodine or aerosols in the vent gas. Sodium thiosulfate, sodium hydroxide, or the like may be added to the scrubbing water 110. When the vent gas is introduced, the scrubbing water 110 dissolves and traps the inorganic iodine or the aerosols.

The organic iodine remover 120 is mainly used for removing the organic iodine in the vent gas. As described later, the organic iodine remover 120 is an ionic substance composed of a cation and an anion. By individually storing the organic iodine remover 120 in the storage vessel 12, deterioration due to water, oxygen, or the like is prevented.

It is preferable that in the filtered containment venting apparatus 100, when the organic iodine remover 120 is injected from the storage vessel 12 into the filtered containment venting vessel 1, the scrubbing water 110 and the organic iodine remover 120 are phase-separated without being mixed with each other so as to form a multilayer liquid. The multilayer liquid can be formed by using the organic iodine remover 120 which is hydrophobic and is hardly compatible with the scrubbing water 110.

A relationship between specific gravities of the scrubbing water 110 and the organic iodine remover 120 is not particularly limited. However, from the viewpoint of preventing chemical species containing the radioactive iodine from volatilizing into the gas phase in the vessel, it is preferable to use the organic iodine remover 120 having a specific gravity larger than that of the scrubbing water 110. When such an organic iodine remover 120 is used, the scrubbing water 110 can form an upper layer and the organic iodine remover 120 can form a lower layer.

As shown in FIG. 1, in the filtered containment venting vessel 1, the metal filter 8 is provided at the upper portion in the vessel. The metal filter 8 is formed by laminating a metal fiber, a metal mesh, or the like. With the metal filter

8, the aerosols released into the gas phase in the vessel are trapped by adhering to a metal, colliding with the metal, and the like.

The outlet pipe 9 is connected to the filtered containment venting vessel 1. One end of the outlet pipe 9 is connected to a secondary side of the metal filter 8, and the other end of the outlet pipe 9 is connected to the exhaust cylinder 10. The exhaust cylinder 10 is installed outside the reactor containment vessel 2 to release, into the environment, the vent gas from which the radioactive substances are removed.

The filtered containment venting vessel 1 can also include a baffle (not shown) that applies a resistance to the vent gas flowing into the vessel. As the baffle, for example, an orifice-shaped baffle plate, a spiral plate, a porous plate such as a metal mesh or a punched metal, or a porous body such as ceramic can be used. The baffle can be provided at a height of a liquid phase part inside the filtered containment venting vessel 1.

The organic iodine flowing into the filtered containment venting vessel 1 is estimated to be gaseous. It is considered that dissolution of the gaseous organic iodine and decomposition of the organic iodine proceed by diffusion electrophoresis, thermophoresis, Brownian diffusion, convection, and the like in air bubbles. When the baffle is provided inside the filtered containment venting vessel 1, a residence time of the air bubbles ejected into the vessel becomes long and a contact time between the organic iodine and the organic iodine remover 120 becomes long, so that removal efficiency for the organic iodine can be improved.

When a serious accident involving a breakage of a pressure vessel occurs in the reactor, various radioactive substances are released into the containment vessel together with high-temperature and high-pressure steam generated by evaporation of cooling water or the like. A release amount depends on reactor power and accident scenarios, and it is evaluated that during a severe accident involving fuel failure such as the breakage of the pressure vessel, about 1 kg of the radioactive organic iodine is released. It is evaluated that as the organic iodine, methyl iodine ($CH_3I$) is mainly generated.

When the pressure and the temperature in the containment vessel are excessively high due to occurrence of the serious accident in the reactor, the containment vessel is broken and large-scale leakage of the radioactive substances occurs. Therefore, the venting is performed in order to prevent an abnormal rise in pressure and temperature in the containment vessel. When it is determined that the venting is required in the reactor containment vessel 2 shown in FIG. 1, the isolation valves 5 and 6 are opened.

When the isolation valve 5 is opened, the high-temperature and high-pressure steam in the dry well 21 flows into the filtered containment venting vessel 1 through the dry well venting pipe 3. In addition, when the isolation valve 6 is opened, the high-temperature and high-pressure steam in the wet well 22 flows into the filtered containment venting vessel 1 through the wet well venting pipe 4. The vent gas containing the radioactive substances is passed through the scrubbing water 110 and the organic iodine remover 120.

In the filtered containment venting vessel 1, the inorganic iodine and the aerosols among the radioactive substances contained in the vent gas are trapped in the vessel by the scrubbing water 110. In addition, the organic iodine is trapped in the vessel by the organic iodine remover 120. The aerosols released into the gas phase in the vessel are trapped by the metal filter 8. Thereafter, the gas from which the radioactive substances are removed passes through the outlet pipe 9 and is released into the environment by the exhaust cylinder 10.

Next, the organic iodine remover according to the present embodiment for removing the organic iodine in the vent gas will be specifically described.

<Organic Iodine Remover>

As the organic iodine remover, a substance composed of a cation and an anion is used. The organic iodine remover performs "dissolution of the organic iodine", "decomposition of the organic iodine", and "retention of the decomposition product of the organic iodine". By these three steps, the organic iodine in the vent gas is efficiently removed.

It is preferable that the organic iodine remover exhibits non-volatility of not substantially volatilizing at a temperature lower than about 160° C. During the accident in the reactor, it is assumed that the steam is vented at a high temperature of about 100° C. to 160° C. When the organic iodine remover acting as the wet filter is non-volatile, volatilization of the remover itself can be avoided even if the high-temperature and high-pressure vent gas is introduced. A volatilization temperature of the organic iodine remover is preferably 160° C. or higher, and more preferably 200° C. or higher.

The organic iodine remover is preferably a liquid at a temperature of the vent gas, and is preferably a liquid at least at 160° C. under an atmospheric pressure. When the organic iodine remover is a liquid, dissolution of the organic iodine, decomposition of the organic iodine, and retention of the decomposition product thereof can be performed efficiently. The organic iodine remover may be either a liquid or a solid at a temperature lower than the temperature of the vent gas.

As the organic iodine remover, for example, substances referred to as an ionic liquid, a quaternary salt, an interfacial active agent, a phase transfer catalyst, and the like can be used. As the cation of the organic iodine remover, one kind of cation may be used, or a plurality of kinds of cations may be used. In addition, as the anion of the organic iodine remover, one kind of anion may be used, or a plurality of kinds of anions may be used.

As the organic iodine remover, for example, a substance which has a structure in which a cation and an anion are not chemically bonded to each other and are dissociated and which is composed of a cation molecule having the cation in the molecule and an anion molecule having the anion in the molecule can be used. When the ionic substance composed of the cation molecule and the anion molecule is used, properties of the organic iodine remover can be relatively easily controlled by a combination of the molecules.

In addition, as the organic iodine remover, a substance which has a structure in which a cation and an anion are chemically bonded to each other and are not dissociated, which is composed of one molecule, and which is composed of a zwitterionic molecule having a cation and an anion in the molecule can also be used. When the zwitterionic molecule is used, the organic iodine remover which is a solid at a normal temperature can be relatively easily obtained. The organic iodine remover which is a solid at a normal temperature may be advantageous in terms of storage and handling.

In an organic iodine remover ($X^+$—$Y^-$) composed of a cation ($X^+$) and an anion ($Y^-$), the dissolution of the organic iodine is mainly controlled by the cation ($X^+$). In addition, the decomposition of the organic iodine is mainly controlled by the anion ($Y^-$). In addition, the retention of the decomposition product of the organic iodine is mainly controlled by the cation ($X^+$).

As represented by the following expression (1), organic iodine (RI) can be decomposed into an iodide ion ($I^-$) by the organic iodine remover ($X^+$—$Y^-$). The iodide ion ($I^-$) is more stable in the liquid phase than the organic iodine (RI), and is stably retained by the cation ($X^+$). Therefore, leakage of the radioactive organic iodine to the environment can be reliably prevented.

$$X^+—Y^- + RI \rightarrow X^+—I^- + R^+—Y^- \quad (1)$$

In addition, with the organic iodine remover ($X^+$—$Y^-$), it is possible to obtain non-volatility of not substantially volatilizing at 160° C. or lower, heat resistance of being capable of enduring a high temperature of about 160° C. to 200° C., high radiation resistance, high chemical stability, and the like by appropriate selection of the cation ($X^+$) and the anion ($Y^-$). In addition, a compatibility between molecules and a specific gravity between liquids can be easily controlled based on a wide variety of combinations of ions.

<Cation>

As the cation constituting the organic iodine remover, an organic cation having a molecular structure in which an electron donating group is bonded to a phosphorus atom (P), a nitrogen atom (N), or a sulfur atom (S) having a positive charge is used. It is sufficient that at least a part of the cation has such a molecular structure.

A cation in the related art used in a general ionic liquid or the like often has alkyl groups bonded to all bonds of a central atom having a positive charge. In contrast, when the electron donating group is bonded to the central atom having a positive charge, the electrophilicity of the cation is weakened. Since the interaction between the cation and the anion can be weakened, the decomposition of the organic iodine by the anion of the organic iodine remover can be promoted.

The cation constituting the organic iodine remover may have a hydrogen atom or any substituent other than the electron donating group bonded to the central atom of the cation having a positive charge, in addition to the electron donating group. One electron donating group may be bonded to the central atom of the cation, or a plurality of electron donating groups may be bonded to the central atom of the cation. Based on the number of bonded electron donating groups, a decomposition ability for the organic iodine, a dissolution ability for the organic iodine, the non-volatility of the organic iodine remover, and the like can be adjusted.

The substituent other than the electron donating group bonded to the central atom of the cation is preferably an organic group composed of one or more of a carbon atom, a hydrogen atom, an oxygen atom, a nitrogen atom, a sulfur atom, and a halogen atom. When the substituent other than the electron donating group is an organic group, the decomposition ability and the like for the organic iodine can be relatively easily secured.

The substituent other than the electron donating group bonded to the central atom of the cation may have only a single bond or may have a double bond or a triple bond. In addition, the substituent other than the electron donating group may be linear or branched. In addition, the substituents may be bonded to each other to form a ring structure. A substituent may be further bonded to the substituent other than the electron donating group.

Specific examples of the cation constituting the organic iodine remover include organic cations such as phosphonium, ammonium, sulfonium, pyrrolidinium, piperidinium, and morpholinium. Carbon or oxygen of each of these substituents other than the electron donating group bonded to the central atom is preferably bonded to the central atom of the cation having a positive charge by a single bond.

As the cation constituting the organic iodine remover, a phosphonium cation, an ammonium cation, or a sulfonium cation is preferred. With these cations, a remover having a high dissolution ability for the organic iodine can be relatively easily obtained by appropriate selection of the substituent.

For example, 1-butyl-3-methylimidazolium bis(trifluoromethylsulfonyl)amide does not dissolve methyl iodine but phase-separates methyl iodine at a use temperature. In contrast, trihexyl(tetradecyl)phosphonium bis(trifluoromethylsulfonyl)amide having the same anion and having a different cation can dissolve methyl iodine.

Examples of the phosphonium cation include a tertiary phosphonium cation in which one electron donating group and three organic groups are bonded to a central atom, a secondary phosphonium cation in which two electron donating groups and two organic groups are bonded to a central atom, and a primary phosphonium cation in which three electron donating groups and one organic group are bonded to a central atom.

Examples of the ammonium cation include a tertiary ammonium cation in which one electron donating group and three organic groups are bonded to a central atom, a secondary ammonium cation in which two electron donating groups and two organic groups are bonded to a central atom, and a primary ammonium cation in which three electron donating groups and one organic group are bonded to a central atom.

Examples of the sulfonium cation include a secondary sulfonium cation in which one electron donating group and two organic groups are bonded to a central atom, and a primary sulfonium cation in which two electron donating groups and one organic group are bonded to a central atom.

As the cation constituting the organic iodine remover, the tertiary phosphonium cation in which one electron donating group is bonded to a central atom, the tertiary ammonium cation in which one electron donating group is bonded to a central atom, or the secondary sulfonium cation in which one electron donating group is bonded to a central atom is particularly preferred from the viewpoint of the removal efficiency for the organic iodine.

When the substituent other than the electron donating group bonded to the central atom of the cation is an organic group, the number of carbon atoms thereof is preferably 2 or more, more preferably 4 or more, and still more preferably 6 or more. In addition, the number of carbon atoms is preferably 14 or less, more preferably 12 or less, and still more preferably 10 or less. When the number of carbon atoms is less than 2, thermal decomposition of a carbon chain may occur at the temperature of the vent gas of about 160° C. In contrast, when the number of carbon atoms is 2 or more, relatively high heat resistance can be obtained.

For example, it is confirmed that 1-butyl-3-methylimidazolium iodide undergoes self-decomposition by desorbing a methyl group of the cation at 160° C. However, as the number of carbon atoms of the substituent bonded to the central atom of the cation increases and the substituent becomes bulky, higher heat resistance and higher dissolution ability for the organic iodine can be obtained, and therefore, the removal efficiency for the organic iodine increases.

In the cation constituting the organic iodine remover, molecular structures or the numbers of carbon atoms of the substituents may be symmetrical to each other, or may be asymmetrical to each other. The substituents may each independently have an appropriate molecular structure or an appropriate number of carbon atoms according to the non-volatility required for the organic iodine remover, the dissolution ability for the organic iodine, and the like.

As the electron donating group, an appropriate electron donating substituent can be used as long as it exhibits an electron donating property which is stronger than those of other substituents bonded to the central atom of the cation, for example, an alkyl group. When the electron donating group is bonded to the central atom of the cation, the electrophilicity of the cation is weakened as compared with the cation in the related art in which an alkyl group or the like is bonded. The anion can easily act on the organic iodine by weakening the interaction between the cation constituting the organic iodine remover and the anion constituting the organic iodine remover.

As the electron donating group, for example, a primary phosphino group, a secondary phosphino group, or a tertiary phosphino group can be used. These electron donating groups may have any substituent on a phosphorus atom or an organic group. Specific examples of these electron donating groups include a phosphino group ($—PH_2$), an alkylphosphino group (—PHR), and a dialkylphosphino group ($—PR_2$).

In addition, as the electron donating group, a primary amino group, a secondary amino group, a tertiary amino group, or the like can be used. These electron donating groups may have any substituent on a nitrogen atom or an organic group. Specific examples of these electron donating groups include an amino group ($—NH_2$), an alkylamino group (—NHR), and a dialkylamino group ($—NR_2$).

In addition, as the electron donating group, a sulfanyl group (—SH), an alkylsulfanyl group (—SR), and the like can be used. These electron donating groups may have a substituent on a sulfur atom or an alkyl group.

In addition, as the electron donating group, a hydroxy group (—OH), an alkoxy group (—OR), and the like can be used. These electron donating groups may have any substituent on an oxygen atom or an alkyl group.

The substituent bonded to the electron donating group is preferably an organic group composed of one or more of a carbon atom, a hydrogen atom, an oxygen atom, a nitrogen atom, a sulfur atom, and a halogen atom. When the substituent bonded to the electron donating group is an organic group, the electron donating property to the central atom of the cation can be relatively easily secured.

The substituent bonded to the electron donating group may have only a single bond or may have a double bond or a triple bond. In addition, the substituent bonded to the electron donating group may be linear or branched. In addition, the substituents may be bonded to each other to form a ring structure. A substituent may be further bonded to the substituent bonded to the electron donating group.

When the substituent bonded to the electron donating group is an organic group, the number of carbon atoms thereof is preferably 2 or more, more preferably 4 or more, and still more preferably 6 or more. In addition, the number of carbon atoms is preferably 14 or less, more preferably 12 or less, and still more preferably 10 or less. When the number of carbon atoms is less than 2, thermal decomposition of a carbon chain may occur at the temperature of the vent gas of about 160° C. In contrast, when the number of carbon atoms is 2 or more, relatively high heat resistance can be obtained.

Specific examples of the substituent other than the electron donating group bonded to the central atom of the cation and the substituent bonded to the electron donating group include: alkyl groups such as an ethyl group, a propyl group, an iso-propyl group, a butyl group, a sec-butyl group, an iso-butyl group, a tert-butyl group, a pentyl group, a hexyl group, a heptyl group, an octyl group, a nonyl group, and a decyl group; alkenyl groups such as a vinyl group, an allyl group, a butenyl group, and a pentenyl group; alkynyl groups such as an ethynyl group, a propynyl group, a butynyl group, and a pentynyl group; cycloalkyl groups such as a cyclopropyl group, a cyclobutyl group, a cyclopentyl group, and a cyclohexyl group; aryl groups such as a phenyl group, a tolyl group, a xylyl group, a naphthyl group, and a biphenyl group; and arylalkyl groups such as a benzyl group, a phenethyl group, and a styryl group.

The cation constituting the organic iodine remover may be composed only of a cation molecule having a molecular structure in which the electron donating group is bonded to the central atom of the cation, or may be composed of a combination of a cation molecule having a molecular structure in which the electron donating group is bonded to the central atom of the cation, and a cation molecule having a molecular structure in which the electron donating group is not bonded to the central atom of the cation.

When the cation constituting the organic iodine remover is composed of a combination of the cation molecule in which the electron donating group is bonded, and the cation molecule in which the electron donating group is not bonded, a ratio of the cation molecule in which the electron donating group is bonded is preferably 1% or more, more preferably 3% or more, and still more preferably 5% or more. However, the ratio of the cation molecule in which the electron donating group is bonded can be adjusted to any ratio according to the removal efficiency for the organic iodine, the dissolution ability for the organic iodine, or the like.

<Anion>

As the anion constituting the organic iodine remover, an appropriate anion can be used as long as it exhibits nucleophilicity to the organic iodine and can combine with the above cation to obtain the non-volatility required for the organic iodine remover and the dissolution ability for the organic iodine. As the anion, either an organic anion or an inorganic anion can also be used.

The anion constituting the organic iodine remover is preferably an organic anion having a negative charge in a carbon atom (C), a sulfur atom (S), a nitrogen atom (N), or an oxygen atom (O), an inorganic anion having a negative charge in an oxygen atom (O), or an inorganic anion having a negative charge in a halogen atom. When the anion constituting the organic iodine remover is such an anion, an organic iodine remover having a high decomposition ability for the organic iodine can be obtained due to the nucleophilicity of a central atom.

The anion constituting the organic iodine remover may have a hydrogen atom or any substituent bonded to the central atom of the anion having a negative charge.

Specific examples of the organic anion having a negative charge in the carbon atom (C) include a methyl anion ($H_3C^-$), a primary carbanion ($H_2RC^-$), a secondary carbanion ($HR_2C^-$), a tertiary carbanion ($R_3C^-$), a cyanide ion ($NC^-$), and an alkynide anion ($RCC^-$). These organic anions may have any substituent on a carbon atom, an organic group, or an alkyl group.

Specific examples of the organic anion having a negative charge in the sulfur atom (S) include a sulfanide anion ($RS^-$). These organic anions may have any substituent on the sulfur atom.

Specific examples of the organic anion having a negative charge in the nitrogen atom (N) include an azide anion ($N_3^-$), a primary amide anion ($H_2N^-$), a secondary amide anion ($HRN^-$), and a tertiary amide anion ($R_2N^-$). These organic anions may have any substituent on a nitrogen atom or an organic group.

Specific examples of the organic anion having a negative charge in the oxygen atom (O) include an alkoxide anion ($RO^-$), a carboxylate anion ($RCO_2^-$), a phosphite anion ($RPO_3^-$), a sulfite anion ($RSO_3^-$), a phosphate anion ($RPO_4^-$), a hypophosphite anion ($R_2PO_2$—), and a methoxide anion ($R_3CO^-$). These organic anions may have any substituent on an oxygen atom or an alkyl group.

Specific examples of the inorganic anion having a negative charge in the oxygen atom (O) include a hydroxide ion ($HO^-$), a nitrite anion ($NO_2^-$), a nitrate anion ($NO_3^-$), a trioxygen fluoride anion ($FO_3^-$), a chlorate anion ($ClO_3^-$) a bromate anion ($BrO_3^-$), an iodate anion ($IO_3^-$), a tetraoxygen fluoride anion ($FO_4^-$), a perchlorate anion ($ClO_4^-$), a perbromate anion ($BrO_4^-$), and a periodate anion ($IO_4^-$).

Specific examples of the inorganic anion having a negative charge in the halogen atom include a fluoride ion ($F^-$), a chloride ion ($Cl^-$), a bromide ion ($Br^-$), an iodide ion ($I^-$), a trifluoride ion ($F_3^-$), a trichloride ion ($Cl_3^-$), a tribromide ion ($Br_3^-$), and a triiodide ion ($I_3^-$).

The substituent bonded to the anion may have only a single bond or may have a double bond or a triple bond. In addition, the substituent bonded to the anion may be linear or branched. In addition, the substituents may be bonded to each other to form a ring structure. In addition, a substituent may be further bonded to the substituent bonded to the anion as long as it does not significantly influence the nucleophilicity.

When the substituent bonded to the anion is an organic group, the number of carbon atoms thereof is preferably 2 or more, and more preferably 4 or more. In addition, the number of carbon atoms is preferably 12 or less, more preferably 10 or less, and still more preferably 8 or less. When the number of carbon atoms is less than 2, thermal decomposition of a carbon chain may occur at the temperature of the vent gas of about 160° C. In contrast, when the number of carbon atoms is 2 or more, relatively high heat resistance can be obtained. In addition, a steric hindrance is reduced as the number of carbon atoms decreases to some extent, and therefore, the decomposition ability for the organic iodine is increased.

Specific examples of the substituent bonded to the anion include substituents which are the same as the substituent other than the electron donating group bonded to the central atom of the cation and the substituent bonded to the electron donating group. The substituent bonded to the anion may be further substituted with a halogen atom such as a fluorine atom or a bromine atom, a phosphino group, an amino group, a sulfanyl group, a hydroxy group, an alkoxy group, a nitro group, a cyano group, or the like as long as the nucleophilicity of the central atom is not significantly impaired. For example, a part or all of hydrogen atoms bonded to carbon when the substituent is an organic group may be substituted with a fluorine atom or the like.

As the anion constituting the organic iodine remover, from the viewpoint of the decomposition ability for the organic iodine, an anion having high nucleophilicity is preferred, and an anion in which a central atom having a negative charge is located at a terminal of a molecular chain excluding a hydrogen atom is preferred. It is preferable that an electron withdrawing substituent, a substituent having a large number of carbon atoms, or a bulky substituent is not bonded to the central atom located at the terminal of the molecular chain of the anion. The central atom of the anion may be substituted with an electron donating substituent such as an alkyl group.

For example, as compared with the primary amide anion ($H_2N^-$), the tertiary amide anion ($R_2N^-$) or the like has low nucleophilicity and has low decomposition ability for the organic iodine since the nitrogen atom having a negative charge is located at the terminal of the molecular chain. In contrast, with the primary organic anion, the inorganic anion or the like in which the central atom is located at the terminal of the molecular chain, the organic iodine can be efficiently decomposed.

Specific examples of the anion constituting the organic iodine remover preferably include an organic anion having a negative charge in a carbon atom (C), a sulfur atom (S), a nitrogen atom (N), or an oxygen atom (O), an inorganic anion having a negative charge in an oxygen atom (O), or an inorganic anion having a negative charge in a halogen atom, because it has high nucleophilicity, is less likely to undergo hydrolysis, and is less likely to change the pH of the scrubbing water when the organic iodine remover is injected into the filtered containment venting vessel as compared with hexafluorophosphate, acetate, sulfonate, or the like which is generally used as the anion in the ionic liquid.

Next, an example of removal of the organic iodine using the organic iodine remover according to the present embodiment will be specifically described.

FIG. 2 is a diagram showing specific examples of the removal efficiency for the organic iodine using the organic iodine remover and a chemical structure of the organic iodine remover.

FIG. 2 shows a result of allowing a gas containing the organic iodine to pass through the organic iodine remover, and calculating a ratio (removal efficiency) of an amount of the organic iodine measured after passing through the organic iodine remover to an initial amount. As the organic iodine remover, seven kinds of A to G are used. Results of removal efficiencies of D to G are results of mixed agents in which C is mixed with D to G. Amounts of D to G contained in the mixed agents are all 9%.

A in FIG. 2 is trihexyl(tetradecyl)phosphonium bis(trifluoromethylsulfonyl)amide.

B in FIG. 2 is trihexyl(tetradecyl)phosphonium dicyanamide.

C in FIG. 2 is trihexyl(tetradecyl)phosphonium chloride.

D in FIG. 2 is phosphanyldihexyl(tetradecyl)phosphonium chloride.

E in FIG. 2 is aminodihexyl(tetradecyl)phosphonium chloride.

F in FIG. 2 is thioldihexyl(tetradecyl)phosphonium chloride.

G in FIG. 2 is hydroxydihexyl(tetradecyl)phosphonium chloride.

Test conditions are close to actual conditions in the filtered containment venting, a methyl iodine concentration is 50 ppm, the temperature is 160° C., and the residence time is 0.5 sec.

As shown in A in FIG. 2, when the cation is trihexyl(tetradecyl)phosphonium and the anion is a bis(trifluoromethylsulfonyl)amide ion, the removal efficiency for methyl iodine is 1% or less.

In addition, as shown in B in FIG. 2, when the cation is trihexyl(tetradecyl)phosphonium and the anion is dicyanamide, the removal efficiency for methyl iodide is 50%.

In addition, as shown in C in FIG. 2, when the cation is trihexyl(tetradecyl)phosphonium and the anion is a chloride ion, the removal efficiency for methyl iodine is 99%.

The decomposition of the organic iodine is controlled by the nucleophilicity of the anion. Specifically, the decomposition of the organic iodine is controlled by basicity of an atom having a negative charge and a three-dimensional structure around the atom having a negative charge. A reason why the anions of A and B in FIG. 2 have nucleophilicity lower than that of C includes that a bulky substituent is bonded to the nitrogen atom having a negative charge, the steric hindrance is large, and a decomposition reaction is inhibited.

Therefore, $PF_6^-$, $BF_4^-$, $FeCl_4^-$, $AlCl_4^-$, $Al_2Cl_7^-$ and the like which are general anions have a substituent (a fluorine atom or a chlorine atom) bonded to an atom (a phosphorus atom, a boron atom, an iron atom, or an aluminum atom) having a negative charge, and the steric hindrance is large, so that removal performance for methyl iodine cannot be expected.

In contrast, when the anion is a chloride ion and the cation is phosphanyldihexyl(tetradecyl)phosphonium as shown in D in FIG. 2, when the anion is a chloride ion and the cation is aminodihexyl(tetradecyl)phosphonium as shown in E in FIG. 2, when the anion is a chloride ion and the cation is sulfanyldihexyl(tetradecyl)phosphonium as shown in F in FIG. 2, or when the anion is a chloride ion and the cation is hydroxydihexyl(tetradecyl)phosphonium as shown in G in FIG. 2, the removal efficiency for methyl iodine is 99.9%.

Since the electron donating group is bonded to the central atom of the cation in D to G in FIG. 2, the electrophilicity of the cation is weakened and the interaction between the cation and the anion is weakened, so that it is considered that the decomposition of the organic iodine by the anion is promoted. Since the anion of the organic iodine remover stably retains the iodide ion generated by the decomposition, it is considered that there is almost no volatilization of chemical species containing iodine.

In addition, when the organic iodine remover and the scrubbing water are used in combination in the filtered containment venting vessel, since the scrubbing water is alkaline, it can be said that the iodide ion generated by the decomposition can be stably retained in the vessel.

On the other hand, even in a case where the anion has high nucleophilicity, when the organic iodine remover does not dissolve the organic iodine, the organic iodine cannot be removed. For example, it is confirmed that almost no organic iodine can be removed by 1-butyl-3-methylimidazolium iodide that has an anion having high nucleophilicity and a cation not dissolving the organic iodine.

In addition, even in a case where the organic iodine remover dissolves the organic iodine, when the organic iodine remover is a neutral molecule, the organic iodine cannot be removed. For example, it is confirmed that almost no organic iodine can be removed by trioctylamine ($N(C_8H_{17})_3$) which is a neutral molecule and dissolves methyl iodine or the like. Therefore, it can be said that as the organic iodine remover, an ionic substance composed of a cation and an anion is effective.

The organic iodine remover described above can be used in the filtered containment venting apparatus 100 as shown in FIG. 1, or can be used in other applications for which removal of the organic iodine is required. For example, the organic iodine remover can be used in a pressure suppression pool in a wet well of the reactor containment vessel, an off-gas apparatus provided in the reactor facility, or the like. The organic iodine remover can also be used as a shielding structure for a storage vessel and a transport vessel for nuclear fuel materials including an unused nuclear fuel and a spent nuclear fuel, a storage vessel and a transport vessel for replaced or disassembled reactor core internal structures, or the like.

With the organic iodine remover described above, since the electron donating group is bonded to the central atom of the cation constituting the organic iodine remover, the electrophilicity of the cation is weakened and the interaction between the cation and the anion is weakened, so that the decomposition of the organic iodine by the anion can be promoted. When the organic iodine is decomposed, the radioactive iodine contained in the organic iodine is easily trapped by the organic iodine remover. Therefore, the organic iodine in the fluid can be efficiently removed by three steps of the dissolution of the organic iodine, the decomposition of the organic iodine, and the retention of the decomposition product of the organic iodine.

In addition, the filtered containment venting apparatus (organic iodine removing apparatus) 100 using the organic iodine remover described above includes: the filtered containment venting vessel 1 (vessel) into which the organic iodine remover 120 for removing the organic iodine is charged; and the dry well venting pipe (introduction pipe) 3, the wet well venting pipe (introduction pipe) 4, and the inlet pipe (introduction pipe) 7 through which the vent gas (fluid) containing the organic iodine is introduced into the organic iodine remover 120. Therefore, the organic iodine can be removed with a high removal ratio.

Therefore, in the filtered containment venting apparatus (organic iodine removing apparatus) 100, the vent gas can be treated by using the organic iodine remover alone. With the organic iodine remover, 99.9% or more of an assumed amount of the organic iodine can be removed from the vent gas released from the reactor containment vessel. Since the residence time of the vent gas in the wet filter can be shortened by improving trapping efficiency for the organic iodine, amounts of the organic iodine remover and the scrubbing water to be used can be reduced, or the filtered containment venting vessel can be reduced in size.

In addition, since the organic iodine remover described above is not significantly influenced by moisture and can efficiently prevent release of the radioactive iodine into the atmosphere, a filtered containment venting apparatus having a complicated structure is not required. It is possible to achieve a simple design in which the organic iodine remover is used alone without complicating a system for removing the organic iodine as in a technique described in PTL 2. Therefore, an increase in treatment cost can also be prevented. In addition, since it is not necessary to introduce a large-scale apparatus, the organic iodine remover can also be applied to an existing filtered containment venting apparatus, and a static system of the filtered containment venting apparatus can be maintained.

In addition, as the organic iodine remover described above, substances classified as an ionic liquid, a quaternary salt, an interfacial active agent, a phase transfer catalyst, and the like can be used. In particular, the ionic liquid has a property of being high in non-volatility, and has sufficient heat resistance against the vent gas of about 200° C. which is expected to flow into the filtered containment venting apparatus during the accident in the reactor. In addition, the ionic liquid also has excellent radiation resistance and has a property of dissolving substrates such as the radioactive substances at a high concentration. The organic iodine is a highly volatile substance that is poorly soluble in water. When the ionic liquid is used, the removal efficiency for the radioactive substances can be improved by the interaction between the ions or the like. In addition, when the interfacial active agent, the quaternary salt, the phase transfer catalyst, or the like is used, high removal efficiency can be similarly obtained.

In addition, the organic iodine remover described above can be used in a liquid state with respect to the vent gas of about 200° C. Therefore, during the accident in the reactor, dissolution performance and decomposition performance for the organic iodine, and retention performance for the decomposition product can also be stably maintained. Therefore, the removal of the organic iodine in the vent gas can continue over a long period of time until the accident in the reactor is settled.

Although the embodiments of the organic iodine remover according to the invention and the organic iodine removing apparatus using the organic iodine remover have been described above, the invention is not limited to the embodiments described above, and various modifications are included as long as these modifications do not depart from the technical scope. For example, the embodiments described above are not necessarily limited to those including all configurations described above. Further, a part of the configuration of one embodiment may be replaced with another configuration, or another configuration may be added to the configuration of one embodiment. Further, addition of another configuration, deletion of a configuration, and replacement of a configuration can be made for a part of the configuration of one embodiment.

For example, the filtered containment venting apparatus 100 is connected to the dry well 21 and the wet well 22. However, the filtered containment venting apparatus using the organic iodine remover may be connected to either the dry well or the wet well. The filtered containment venting apparatus may be individually installed for each of the dry well and the wet well. Pipe systems such as venting pipes connected to the filtered containment venting apparatus can be connected to an appropriate location in the reactor containment vessel.

In addition, the filtered containment venting apparatus 100 is configured such that the organic iodine remover 120 is injected from the storage vessel 12 into the filtered containment venting vessel 1. However, the organic iodine remover 120 may be stored in advance in the filtered containment venting vessel 1 before the accident in the reactor.

Further, in the filtered containment venting vessel 1, the scrubbing water 110 and the organic iodine remover 120 are used in combination. However, in the filtered containment venting vessel 1, only the organic iodine remover 120 may be used and the scrubbing water 110 may not be used. Alternatively, only the scrubbing water 110 may be used in the filtered containment venting vessel 1, and the organic iodine remover 120 may be used in another vessel. The other vessel may be disposed on either an upstream side or a downstream side of the filtered containment venting vessel 1.

In addition, for the filtered containment venting apparatus 100 described above, the type of the reactor is not particularly limited. As the reactor, various types of reactors such as a boiling water reactor (BWR), an advanced boiling water reactor (ABWR), and a pressurized water reactor (PWR) can be applied. The ionic liquid or the like that can be used as the organic iodine remover is charged to practical use for general industry. The ionic liquid or the like contaminated with the radioactive substances can be treated and regenerated by, for example, a method described in JP-T-2003-507185, or the like.

REFERENCE SIGNS LIST

1: filtered containment venting vessel (vessel)
2: reactor containment vessel
3: dry well venting pipe (introduction pipe)
4: wet well venting pipe (introduction pipe)
5: isolation valve
6: isolation valve
7: inlet pipe (introduction pipe)
8: metal filter
9: outlet pipe
10: exhaust cylinder
12: storage vessel
13: injection pipe
14: injection valve
20: reactor pressure vessel
21: dry well
22: wet well
100: filtered containment venting apparatus (organic iodine removing apparatus)
110: scrubbing water
120: organic iodine remover

The invention claimed is:

1. An organic iodine remover for removing organic iodine, wherein the organic iodine remover is a substance composed of a cation and an anion, wherein the cation includes:

a first cation including a molecular structure in which an electron donating group is bonded to a phosphorus atom, a nitrogen atom, or a sulfur atom; and a second cation including a molecular structure in which an electron donating group is not bonded, wherein the first cation is 5% or more relative to the cation included in the organic iodine remover, wherein the anion is halide ion, and wherein the organic iodine remover has a volatilization temperature of 160° C. or higher.

2. The organic iodine remover according to claim 1, wherein the electron donating group bonded to the phosphorus atom, the nitrogen atom, or the sulfur atom includes one or more electron donating groups.

3. The organic iodine remover according to claim 1, wherein the electron donating group is a primary phosphino group which may have a substituent, a secondary phosphino group which may have a substituent, or a tertiary phosphino group which may have a substituent.

4. The organic iodine remover according to claim 1, wherein the electron donating group is a primary amino group which may have a substituent, a secondary amino group which may have a substituent, or a tertiary amino group which may have a substituent.

5. The organic iodine remover according to claim 1, wherein the electron donating group is a sulfanyl group, or an alkylsulfanyl group which may have a substituent.

6. The organic iodine remover according to claim 1, wherein the electron donating group is a hydroxy group, or an alkoxy group which may have a substituent.

7. The organic iodine remover according to claim 4, wherein the substituent is a substituent composed of one or more of a carbon atom, a hydrogen atom, an oxygen atom, a nitrogen atom, a sulfur atom, and a halogen atom.

8. The organic iodine remover according to claim 5, wherein the substituent is a substituent composed of one or more of a carbon atom, a hydrogen atom, an oxygen atom, a nitrogen atom, a sulfur atom, and a halogen atom.

9. The organic iodine remover according to claim 6, wherein the substituent is a substituent composed of one or more of a carbon atom, a hydrogen atom, an oxygen atom, a nitrogen atom, a sulfur atom, and a halogen atom.

10. The organic iodine remover according to claim 4, wherein the substituent is a substituent composed of one or more of a single bond, a double bond, and a triple bond.

11. The organic iodine remover according to claim 5, wherein the substituent is a substituent composed of one or more of a single bond, a double bond, and a triple bond.

12. The organic iodine remover according to claim 6, wherein the substituent is a substituent composed of one or more of a single bond, a double bond, and a triple bond.

13. The organic iodine remover according to claim 1, wherein the organic iodine remover removes a radioactive organic iodine included in a vent gas released from a reactor containment vessel.

14. The organic iodine remover according to claim 1, wherein the wherein the anion is halide ion.

* * * * *